United States Patent
Christie et al.

[11] Patent Number: 5,940,194
[45] Date of Patent: *Aug. 17, 1999

[54] REAL TIME-DETERMINATION OF INTERCONNECT METROLOGY USING BINARY COMPUTER-GENERATED HOLOGRAMS

[75] Inventors: Phillip Christie, Landenberg, Pa.; Shadi A. Abughazaleh, Newark, Del.

[73] Assignee: University of Delaware, Newark, Del.

[*] Notice: This patent issued on a continued prosecution application filed under 37 CFR 1.53(d), and is subject to the twenty year patent term provisions of 35 U.S.C. 154(a)(2).

[21] Appl. No.: 08/735,237

[22] Filed: Oct. 22, 1996

[51] Int. Cl.[6] .............................. G02B 5/32; G02B 5/18; G03H 1/08; G01B 9/02
[52] U.S. Cl. .................. 359/15; 359/9; 359/572; 356/354
[58] Field of Search ...................... 356/354, 355, 356/356; 359/569, 567, 572, 15, 1, 2, 9

[56] References Cited

U.S. PATENT DOCUMENTS

| | | | |
|---|---|---|---|
| 4,303,341 | 12/1981 | Kleinknecht et al. | 356/355 |
| 4,408,884 | 10/1983 | Kleinknecht et al. | |
| 4,568,141 | 2/1986 | Aute | 359/572 |
| 5,301,062 | 4/1994 | Takahashi et al. | 359/567 |
| 5,361,137 | 11/1994 | Aton et al. | |
| 5,422,723 | 6/1995 | Paranjpe et al. | 356/355 |
| 5,729,365 | 3/1998 | Sweatt | 359/2 |

*Primary Examiner*—Thong Nguyen
*Assistant Examiner*—Audrey Chang
*Attorney, Agent, or Firm*—Connolly & Hutz

[57] ABSTRACT

Holographic test structures on a semiconductor wafer are used to provide real-time analysis of upstream fabrication processing parameters. The test structures comprise reflective segments within multiple cells on the test structure. The size and placement of the reflective segments within the cells are determined by diffraction theory in such a way that a desired image is projected from the test structure. The intensity, sharpness, and shape of the image is used as a direct measure of the upstream fabrication process parameters.

12 Claims, 2 Drawing Sheets

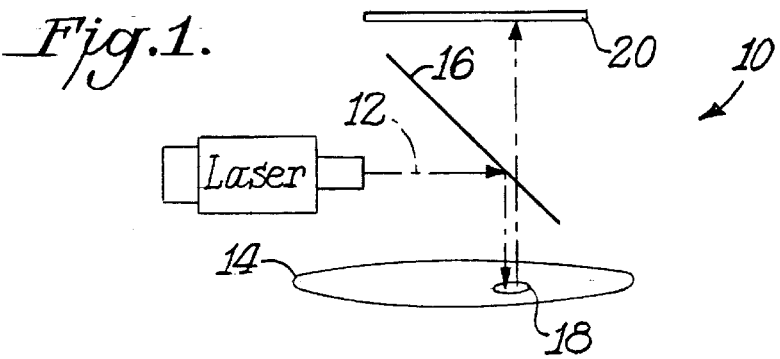
Fig. 1.
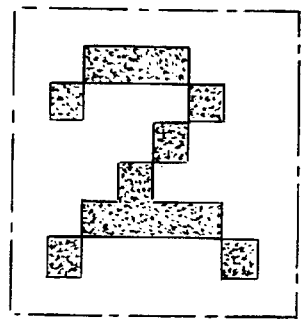
Fig. 3A.
Fig. 3B.
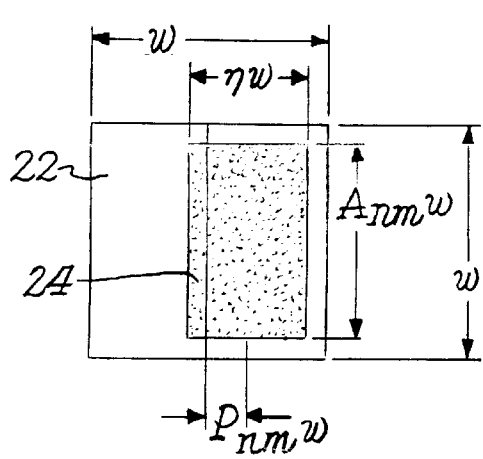
Fig. 4.
Fig. 5.

REAL TIME-DETERMINATION OF INTERCONNECT METROLOGY USING BINARY COMPUTER-GENERATED HOLOGRAMS

GOVERNMENT LICENSE RIGHTS

The U.S. Government has a paid-up license in this invention and the right in limited circumstances to require the patent owner to license others on reasonable terms as provided for by the terms of MIP 9414187 awarded by NSF.

BACKGROUND OF THE INVENTION

This invention relates to means for ascertaining the fabrication tolerances of integrated circuit (IC) assemblies, particularly Very Large Scale Integration (VLSI) devices. One or more test structures are included on a silicon wafer at the various stages of its manufacture as described in Aton et al., U.S. Pat. No. 5,361,137. These test structures are not necessarily designed to be electrically functional IC's but rather sampling areas on the wafer from which the fabrication tolerances of the IC manufacturing process can be tested. This invention particularly lends itself to real-time, non-contact, and in-process determination of such accuracy.

The typical process for the manufacture of ICs is well known and consists of the sequential deposition, and partial removal by etching, of conducting and insulating materials. As the demand for computer performance has exponentially increased over the years the manufacturing tolerances used in making ICs have tightened considerably. Typical manufacturing processes now have to deal with device and interconnect geometries whose minimum characteristic dimensions are rapidly approaching 0.1 microns and are therefore beyond the resolving power of traditional optical microscopes.

Various efforts have been made to gauge (measure) those increasingly narrowing manufacturing tolerances. One approach is found in Kleinknecht U.S. Pat. No. 4,408,884 and references cited therein which describe the use of a monochromatic light source, such as a laser beam, focused on a test portion of silicon wafers. The portion of the beam diffracted off the pattern (diffraction grating pattern) on the wafer is carefully measured to determine the accuracy and reliability of the manufacturing process.

One disadvantage of the approach in Kleinknecht U.S. Pat. No. 4,408,884 is the difficulty and time needed to analyze the complex patterns generated by the laser beam as it diffracts off the test grating patterns. The approach of the Kleinknecht patent is therefore highly impractical as an in-process (real-time) method of analyzing chip production tolerances.

One proposal for a real-time method of measuring sub-micron line widths during chip manufacture is described in Aton U.S. Pat. No. 5,361,137. That patent describes a method of measuring the first and second order intensities of diffraction peaks from test areas containing test gratings of known spacing or pitch. However, this technique suffers from the same problems of analysis as that of Kleinknecht et al., since relatively simple test gratings are employed to produce highly complex diffraction patterns.

This invention solves the problems with these approaches and provides a practical real-time analysis of dielectric thickness, planar uniformity, edge roughness, mask alignment, and other chip manufacturing process parameters.

SUMMARY OF THE INVENTION

Real-time testing of the variation of crucial dimensions of the elements which are used to construct circuits on a chip is made possible by this invention. Specialized holographic test structures constructed from the same conducting and insulating elements which are used in the actual chip manufacture yield information about dielectric thickness, planar uniformity, edge roughness, and other process parameters which permit almost instant analysis of production parameters. These test structures described in this invention are much more complicated than the grating test structures disclosed in Kleinknecht U.S. Pat. No. 4,408,884 and the approach described in Aton U.S. Pat. No. 5,361,137. However, the IC manufacturing process is ideally suited to the design of such complex structures, as evidenced by the implementation of the complexity of the integrated circuit itself. Once fabricated, however, holographic test structures offer significant advantages over previous test structures because of their ease of interpretation and their ability to be optimized for specific types of failure mode.

The real-time analysis made possible by this invention is accomplished by design of special test structures or patterns on limited areas of a semiconductor wafer being processed. In its simplest form, the arrangement of conducting and/or insulating elements on the wafer surface is determined by the inverse two-dimensional Fourier Transform (2DIFT) of a pattern or image that is to be detected by imaging apparatus, or by a trained technician. The test structures on the wafer are fabricated with structural elements of carefully calculated size and position so that the degradation in the quality of the image observed by the apparatus or technician is directly related to the degradation in the parameters which characterize tolerances of the fabrication process. Consequently, any variations in the quality, shape, intensity, or size of the holographic image can be used to indicate a change in parameters characterizing the fabrication process.

In this system an image processing system compares the image detected by the testing apparatus to a standard image and determines what kind of variations are present, whether they are due to placement inaccuracy, thickness inaccuracy, width variations or other parameters. Adjustments in upstream processing can then be made, automatically or manually, to correct process parameters which caused the changes in the holographic image.

BRIEF DESCRIPTION OF THE DRAWINGS

FIG. 1 is a schematic diagram illustrating a test apparatus for implementing this invention;

FIG. 3A is a graphical representation of a diffraction image sought to be produced in accordance with this invention;

FIG. 3B is another (matrix representation) of the image of FIG. 3A;

FIG. 4 is a graphical representation of the parameters used in placement of wire segments in accordance with this invention.

FIG. 5 is a wire segment (8×8) implementation of a pattern used to create an image representing the number "2."

DETAILED DESCRIPTION

Figure 2:
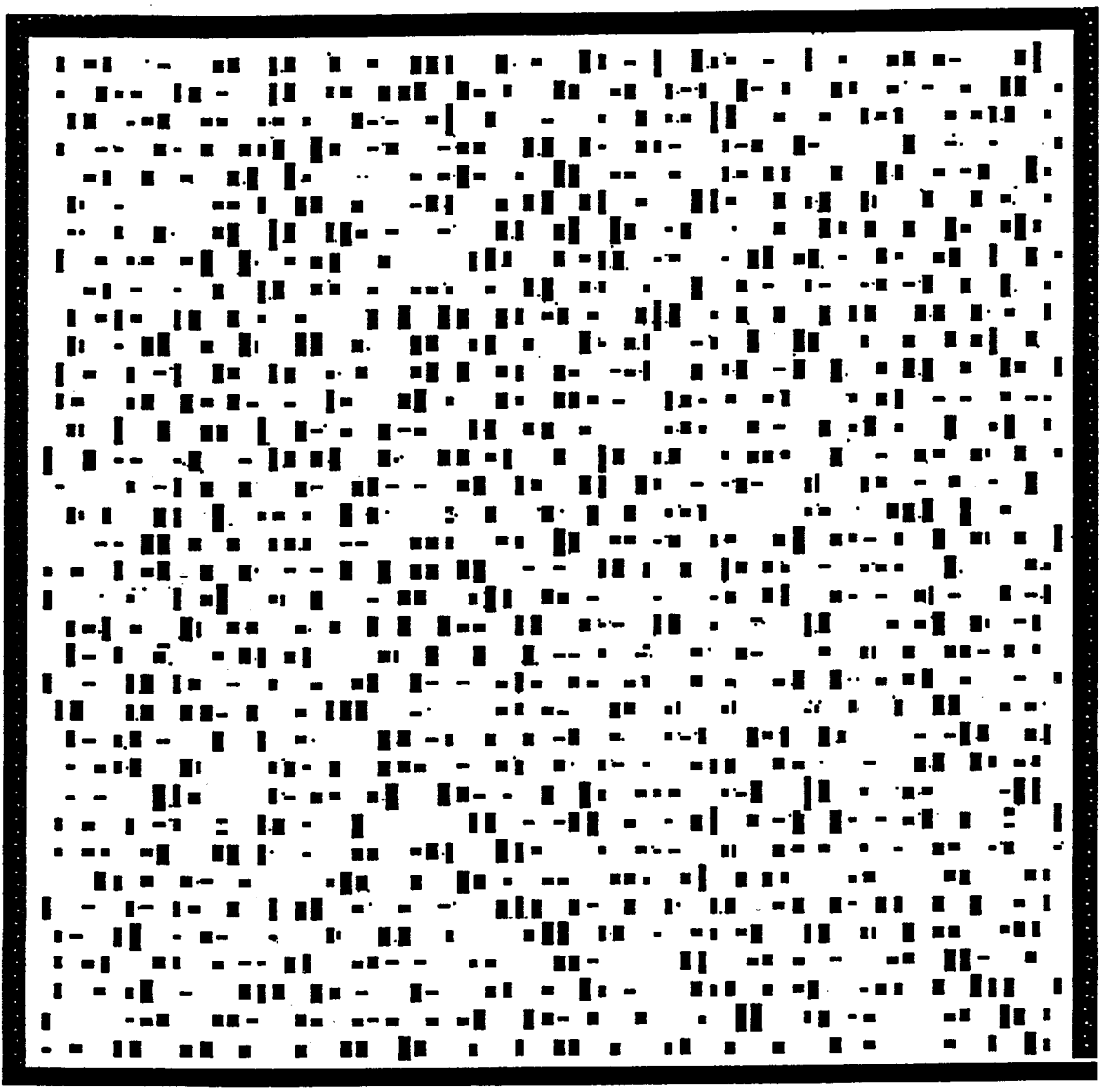
FIG. 2 is a graphical representation of a test structure on a wafer prepared in accordance with this invention.

A test apparatus 10 for use in practice of this invention is illustrated in FIG. 1. In this apparatus a monochromatic light source, such as, but not limited to, a laser beam 12 is aimed at a semiconductor wafer 14 during processing. The beam 12 is aimed directly, or via a half-silvered mirror 16, at a holographic test structure 18 on one or more areas of the wafer 14 or circuit board during its processing or testing. This holographic test structure 18 may be designed to produce easily interpreted information concerning the fabrication tolerances of either actual electrical interconnects or structures on the wafer, but is typically not part of a functional IC.

The holographic test structures on the wafer or circuit board are specially designed to diffract the laser beam 12 toward a receiver or image receptor 20 where the image is analyzed and/or recorded. The intensity and pattern of images sensed in receiver 20 are then analyzed against target values in a signal processing unit (not shown).

The analysis of limited portions of test structure 18 on a wafer or circuit board provides a highly accurate account of the characteristic fabrication process parameters on other areas of the wafer or circuit board, because both areas are produced at the same time using the same deposition and etching patterns. Thus, if there is a fabrication error in one area of the wafer, that same flaw will be present in the structure 18. Use of this invention thus permits accurate analysis of average wire pitch, dielectric thickness, planar uniformity, edge roughness, mask alignment, and other process parameters by a sampling of one or more holographic test structures on the wafer or circuit board.

The design of the holographic test structure on the wafer 18 to permit simplified analysis of production accuracy is central to this invention. Our design of the test structure 18 utilizes binary computer generated holograms (CGHs) to produce a sharp, simple diffraction image that can be quickly and accurately analyzed. This prompt analysis capability facilitates real-time adjustment of upstream processing to correct errors uncovered in the test areas. The following summary of binary CGH will assist in a better understanding of its application in this invention.

In this invention we propose to fabricate special-purpose patterns which will act as test structures. An example of such a CGH is shown in FIG. 2. The darkened rectangles represent, for example, segments of aluminum deposited as part of the fabrication process for actual wires on other parts of the silicon wafer (although any material used in the fabrication process with a reflectivity different from its surroundings will suffice).

The positions and areas of the segments are calculated so that the diffracted beams from the arrangement will produce a viewable holographic image. The quality of image produced by this technique is known to be very sensitive to the accuracy with which the reflective segments are positioned relative to each other and also to the sharpness of their edges. Since the wire segments in the test structure are fabricated using the same technology and at the same time as wires on the chips on other sections of the wafer, the degradation in the quality of the projected hologram is a direct measure of the degradation of the tolerances of the interconnect fabrication process. The simplicity of the image produced by this process will enable wire tolerances to be visually determined by a technician or alternatively by a computer monitored feedback control process. It is anticipated that various holographic images will be designed which are sensitive to different types of process failure mode, e.g., photo-resist under-exposure, mask misalignment, etc.

For the purposes of illustration there is described below the design of a basic wire-segment hologram to produce a diffracted image of the number "2." In practice the actual process is complicated by the need to oversample the image in order to improve image quality and these issues will be addressed later. The image is digitally represented in terms of its component pixel (picture element) values and is shown in FIG. 3A as an intensity bitmap and in FIG. 3B as an equivalent amplitude matrix. Our selected level of sampling results in a 8×8 array of matrix elements $I_{k1}$ whose values are either 0 or 1, representing dark or light areas, respectively.

Let us assume that the wire-segment hologram which is to produce the image is characterized by the two-dimensional spatial function $R(x,y)$, which represents reflectance of the surface at the location $(x,y)$ on the wafer. In the Fraunhofer approximation, scalar diffraction theory states that in order to produce a holographic image pattern $I(u,v)$, the pattern of reflectance on the wafer must be given by $$R(x,y) = \int_x \int_y I(u,v) e^{2\pi j(ux+vy)} du\, dv,$$

where $j = \sqrt{-1}$ and $(u,v)$ are the reduced coordinates in the image plane. This equation is recognized as the inverse Fourier Transform of the required image. In our particular approach the image function is sampled as a discrete amplitude matrix rather than a continuous function and so the inverse transformation is performed numerically on a computer using the Two-dimensional Discrete Inverse Fast Fourier Transform (2DIFT)

$$R_{mn} = \sum_k \sum_l I_{kl} e^{2\pi j[(km)/S(ln)/S]},$$

where s is the number of rows or columns in the image matrix.

The result of the 2DIFT is a reflectance matrix whose elements are complex and of the form $$R_{mn} = \alpha_{mn} e^{j\phi_{mn}}.$$

where $\alpha_{mn}$ represents the amplitude of the radiation diffracted by an element of the hologram matrix at position (mn) and $\phi_{mn}$ represents the phase of the radiation diffracted by an element of the hologram matrix at position (mn).

The amplitude component of the reflectance matrix corresponding to the image matrix in FIG. 3 is $$[\alpha] = \begin{bmatrix} 13 & 5.997 & 1 & 1.424 & 1 & 1.424 & 1 & 5.997 \\ 2.414 & 1.585 & 2.236 & 1 & 1.159 & 1.732 & 1.473 & 2.798 \\ 6.708 & 4.635 & 5.385 & 2.71 & 1 & 2.124 & 3 & 4.319 \\ 0.4142 & 1 & 2.798 & 4.414 & 3.557 & 1.474 & 2.236 & 1.732 \\ 3 & 5.611 & 3.606 & 3.81 & 5 & 3.81 & 3.606 & 5.611 \\ 0.4142 & 1.732 & 2.236 & 1.474 & 3.557 & 4.414 & 2.798 & 1 \\ 6.708 & 4.319 & 3 & 2.124 & 1 & 2.71 & 5.385 & 4.635 \\ 2.414 & 2.798 & 1.473 & 1.732 & 1.159 & 1 & 2.236 & 1.585 \end{bmatrix}$$

and the phase component of the reflectance matrix corresponding to the image matrix in FIG. 3 is $$[\phi] = \begin{bmatrix} 0 & -2.594 & -1.571 & -2.236 & 3.142 & 2.236 & 1.571 & 2.594 \\ -3.142 & 0.7854 & -2.034 & 0.7854 & 0.5299 & 2.972 & -1.856 & 0.2555 \\ -2.034 & 2.666 & 1.19 & -0.04478 & 0 & -1.514 & -1.571 & 1.267 \\ 0 & 2.356 & -0.5299 & 2.356 & -1.286 & 0.5004 & 2.034 & -1.741 \\ 3.142 & 0.421 & -2.159 & -1.338 & 3.142 & 1.338 & 2.159 & -0.421 \\ 0 & 1.741 & -2.034 & -0.5004 & 1.286 & -2.356 & 0.5299 & -2.356 \\ 2.034 & -1.267 & 1.571 & 1.514 & 0 & 0.04478 & -1.19 & -2.666 \\ 3.142 & -0.2555 & 1.856 & -2.972 & -0.5299 & -0.7854 & 2.034 & -0.7854 \end{bmatrix}$$

The next step is to convert these complex matrix element variables into parameters that can be fabricated by simple geometrical alterations of wire segments. There are, in fact, many coding schemes and each one maps phase and intensity information to the wire array differently. A direct and simple coding technique is described by A. W. Lohmann and E. P. Paris in *Binary Fraunhofer Holograms Generated by Computer, Applied Optics,* Vol. 6 (10), pp. 1739–1748 (October 1967). This technique codes the intensity and phase shift by varying the reflective area of a wire segment and its displacement from a centerline within the matrix, respectively.

Each element in the reflectance matrix corresponds to a bounding cell 22 of width and height $\omega$ as illustrated in FIG. 4. Any wire segment 24 placed in this cell is limited to a maximum width and length of $\omega$. For simplicity, amplitude coding is achieved by fixing the width of the wire segment at some fraction $\eta$ of the cell width so that the width of the wire segment 24 corresponds to actual wire widths fabricated as part of the circuit fabrication process. Amplitude coding is then achieved by varying the length of the wire segment 24 expressed as some fraction of cell width, $A_{nm}$. Phase coding is achieved by displacing the wire segment 24 from the centerline of the cell, also expressed as some fraction $P_{nm}$ of the width of cell 22.

The segment variables $A_{nm}$ and $P_{nm}$ are calculated directly from the reflectance matrix elements $\alpha_{nm}$ and $\phi_{nm}$ as $$A_{nm} = \frac{\alpha_{nm}}{\alpha_{max}} \quad P_{nm} = \frac{\phi_{nm}}{\phi_{max}},$$

where $\alpha_{max}$ and $\phi_{max}$ represent the largest values in their respective matrices.

The wire segment implementation of the complex reflectance matrix for the 8×8 representation of the number "2" is shown in FIG. 5.

The above discussion outlines the basic steps needed to implement a wire segment hologram. In practice the sharp nature of the cutoffs in the sampled binary image may require a higher spatial sampling rate in order to maintain image quality through the Fourier Transformation. A higher sampling rate results in a clearer image displayed by the hologram. However, a higher sampling rate requires a higher number of cells and an overall larger hologram to represent it. In addition, unless careful control is kept over maximum and minimum values it is possible that some of the wire segments will overlap with their neighbors. In some cases it is therefore necessary to do pre-processing of the wire segment geometries using an iterative technique which transfers some of the amplitude information into the phase matrix. Such a technique is described in J. R. Fineup *Iterative Method Applied to Image Reconstruction and to Computer-Generated Holograms,* Optical Engineering, Vol. 19(3), pp. 297–305, 1980. SPIE.

Use of these holographic test structures 18 to obtain real-time analysis of wafer manufacturing processes is accomplished by utilizing the test apparatus 10 illustrated in FIG. 1 and briefly outlined above. The laser beam 12 wavelength is chosen such that it is smaller than the width $\omega$ of cell 22.

The laser is directed at the half-silvered mirror 16 which reflects it onto the wire segment test structure 18. The diffracted light from the holographic test structure passes through the half-silvered mirror to form an image on the image receiver 20. This receiver typically contains an image viewing and/or recording device. For real-time analysis and control, a Charge-Coupled Device (CCD) array can be used to capture the image in a digital form directly so that the analysis can be performed in real-time.

The flexibility of the holographic test structures 18 means that the analysis of the data is not a single fixed routine. Both the form of the holographic image and the proper analysis technique have to be chosen to efficiently extract the desired information from the test structure. Under-etching will result in the elements from different cells overlapping. As a result, some of the phase information of the image will be destroyed, leading to an unclear image. Where less metal is removed a higher intensity in the image plane will result in a bright, but unclear, image. Conversely a perfect etching will result in a clear, uniform intensity image. On the other hand, if the metal elements are over-etched, then the size of the elements will be decreased, resulting in a lower intensity being measured for the image. This effect may also lead to the image clarity being reduced. A third effect, where the metal is just eaten away randomly, will result in a very unclear, reduced intensity image. Thus, these characteristics of the image recorded in the image receiver 20 can be immediately analyzed and causative errors in the upstream processing corrected.

We claim:

1. A holographic testing apparatus for providing real-time determination of manufacturing properties of an integrated circuit assembly by testing a holographic test structure formed on a surface of the integrated circuit assembly, wherein the holographic test structure is fabricated at the same time as the integrated circuit assembly, comprises the same conducting and insulating elements used to manufacture wire segments of the integrated circuit assembly, and includes an array of cells containing reflective wire segments therein, the reflective wire segments forming a binary computer generated hologram, the testing apparatus comprising:

means for projecting light onto the holographic test structure; and image receiving means for receiving light diffracted from the holographic test structure, wherein the size and placement of the reflective wire segments within the cells are determined so that the light diffracted from the reflective wire segments forms a viewable holographic image such that any variation in one of the quality, shape, intensity and size of the holographic image from a target image indicates a problem with the manufacturing properties of the integrated circuit assembly.

2. The holographic testing apparatus of claim 1, wherein the reflective wire segments within the cells comprise metallic materials.

3. The holographic testing apparatus of claim 1, wherein the reflective wire segments produce the holographic image having a thickness and edge sharpness substantially the same as the thickness and edge sharpness of the wire segments fabricated on portions of the integrated circuit assembly other than the holographic test structure if there are no problems with the manufacturing properties of the integrated circuit assembly.

4. The holographic testing apparatus of claim 1, wherein the reflective wire segments within the cells comprise material having one of a refractive index and reflectivity different from other material within the cell adjacent the reflective wire segments.

5. The holographic testing apparatus of claim 1, wherein the light source has a wavelength comparable to or less than one dimension of the multiple cells.

6. A method for providing real-time determination of manufacturing properties of elements formed on an integrated circuit assembly, the method comprising the steps of:
    directing a light onto holographic test structures formed on the integrated circuit assembly, wherein each of the holographic test structures is fabricated at the same time as the integrated circuit assembly, comprises the same conducting and insulating elements used to manufacture wire segments of the integrated circuit assembly, and includes multiple cells containing reflective wire segments therein, the reflective wire segments forming a binary computer generated hologram, and the size and placement of the reflective wire segments within the cells being determined so that the light diffracted from the reflective wire segments forms a viewable holographic image;
    analyzing the diffracted holographic image from each of the holographic test structures; and
    comparing the diffracted holographic image to a target image, wherein any variation in one of the quality, shape, intensity and size of the holographic image from the target image indicates a problem with the manufacturing properties of the integrated circuit assembly.

7. A holographic test structure for use with an integrated circuit assembly to provide real-time determination of manufacturing properties of the integrated circuit assembly, the holographic test structure comprising:
    multiple cells formed on a surface of the integrated circuit assembly, the multiple cells being fabricated at the same time as the integrated circuit assembly and being formed from the same conducting and insulating elements used to manufacture wire segments of the integrated circuit assembly, the cells containing reflective wire segments therein in a predetermined portion and location within the cells, wherein the size and placement of the reflective wire segments within the cells are determined so that light diffracted from the reflective wire segments forms a viewable holographic image such that any variation in one of the quality, shape, intensity and size of the holographic image from a target image indicates a problem with the manufacturing properties of the integrated circuit assembly.

8. The holographic test structure of claim 7, wherein the reflective wire segments within the cells comprise metallic materials.

9. The holographic test structure of claim 7, wherein the reflective wire segments produce the holographic image having a thickness and edge sharpness substantially the same as the thickness and edge sharpness of the wire segments fabricated on portions of the integrated circuit assembly other than the holographic test structure if there are no problems with the manufacturing properties of the integrated circuit assembly.

10. The holographic test structure of claim 7, wherein each of the reflective wire segments within the cells comprise material having a reflectivity different from other material within the cell adjacent the wire segment.

11. The holographic test structure of claim 7, wherein the holographic image is created by directing a light source onto the holographic test structure.

12. The holographic test structure of claim 11, wherein the light source has a wavelength comparable to at least one dimension of one of the cells.

* * * * *